United States Patent
Brabander

(10) Patent No.: US 6,326,996 B1
(45) Date of Patent: *Dec. 4, 2001

(54) DISPLAY DEVICE HAVING SELF CONTAINED DIAGNOSTIC IMAGE GENERATION CAPABILITY

(75) Inventor: Ronald L. Brabander, Sioux City, IA (US)

(73) Assignee: Gateway, Inc., N. Sioux City, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/554,073

(22) Filed: Nov. 6, 1995

(51) Int. Cl.[7] ............................ H04N 17/00; H04N 17/02
(52) U.S. Cl. ............................ 348/189; 348/180; 348/181
(58) Field of Search ................................. 348/189, 180, 348/181, 190, 745, 746, 184, 177, 178, 179; 345/12, 13

(56) References Cited

U.S. PATENT DOCUMENTS

| | | | | |
|---|---|---|---|---|
| 4,513,318 | * | 4/1985 | Wilensky et al. | 358/10 |
| 4,533,950 | * | 8/1985 | Harshbarger | 348/189 |
| 4,635,096 | * | 1/1987 | Morgan | 358/10 |
| 4,740,841 | * | 4/1988 | Slavin | 348/177 |
| 4,780,755 | * | 10/1988 | Knierim | 348/180 |
| 4,827,334 | * | 5/1989 | Johnson et al. | 348/189 |
| 4,901,147 | | 2/1990 | Tajima | 358/139 |
| 4,955,680 | * | 9/1990 | Froese-Peeck et al. | 348/189 |
| 5,038,210 | * | 8/1991 | Deckelmann et al. | 348/182 |
| 5,049,791 | * | 9/1991 | Kawakami | 348/191 |
| 5,055,928 | * | 10/1991 | Klingelhofer | 358/10 |
| 5,136,368 | * | 8/1992 | Fairburst | 348/177 |
| 5,175,614 | * | 12/1992 | Proebstel | 348/177 |
| 5,247,358 | | 9/1993 | Richards | 358/139 |
| 5,274,446 | * | 12/1993 | Ashida | 358/139 |
| 5,307,087 | | 4/1994 | Baker | 345/150 |
| 5,345,263 | | 9/1994 | Miller | 348/182 |
| 5,379,062 | * | 1/1995 | Gleim et al. | 348/189 |
| 5,465,121 | * | 11/1995 | Blalock et al. | 348/744 |
| 5,510,851 | * | 4/1996 | Foley et al. | 348/179 |
| 5,532,765 | * | 7/1996 | Inoue et al. | 348/180 |
| 5,541,647 | * | 7/1996 | Moon | 348/180 |
| 5,561,459 | * | 10/1996 | Stokes et al. | 348/184 |
| 5,574,440 | * | 11/1996 | Kurtz | 348/706 |
| 5,602,932 | * | 2/1997 | MacDonald et al. | 348/189 |
| 5,670,972 | * | 9/1997 | Kim | 345/13 |
| 5,670,985 | * | 9/1997 | Cappels, Sr. et al. | 348/184 |
| 5,786,803 | * | 6/1998 | Hernandez et al. | 348/189 |

FOREIGN PATENT DOCUMENTS

| | | |
|---|---|---|
| 4-5688 | 1/1992 | (JP). |
| 5-100648 | 4/1993 | (JP). |

* cited by examiner

Primary Examiner—Andrew Faile
Assistant Examiner—Vivek Srivastava
(74) Attorney, Agent, or Firm—Kenneth J. Cool; Owen J. Gamon; Schwegman, Lundberg, Woessner & Kluth

(57) ABSTRACT

A display device is described which provides a self generated diagnostic image to help determine the functionality of the display device, and to assist in the isolation of problems causing faulty images on the display. The display may be decoupled from an external video source for relocation and testing with out the need for an external video source. Existing circuitry and software providing on screen display functions are enhanced to provide for display of a predetermined pattern of geometric shapes and colors. Segments of lines making up selected geometric shapes are formed with alternating color guns to provide a simple diagnostic for correct alignment of the color guns.

12 Claims, 3 Drawing Sheets

DISPLAY DEVICE HAVING SELF CONTAINED DIAGNOSTIC IMAGE GENERATION CAPABILITY

FIELD OF THE INVENTION

The present invention relates to monitors and televisions, and in particular to a display device having image generation capability without the need for connection to an external signal.

BACKGROUND OF THE INVENTION

Video and graphics display devices, such as television sets and monitors are known to sometimes provide faulty images. Some forms of faulty images include interference or shadowing, where a faint echo of the image is spaced a small distance from the intended image, or is distorted. Further faults include background noise, video ringing, incorrect control functionality, incorrect brightness, pincushion effects and refresh rate problems. Distortion is sometimes referred to as incorrect orthogonality, and is a measure of the geometrical accuracy of the image. Many displays use three color guns, red, green and blue, to generate multicolor images. The color guns must be properly aligned to provide sharp and accurate images. The images displayed on monitors and television sets are usually generated by a computer system in the case of monitors, or from an external broadcast source in the case of televisions. Monitors are also capable of displaying television signals that have been processed by a computer system. The sources of the broadcast signals range from ground based antennas and cable systems to satellite broadcast signals.

Many of the signals provided to television sets require significant processing and tuning prior to viewing on the television. Set top boxes for receiving, tuning and decrypting signals, as well as providing back channel communications to accounting and control facilities of the originator of the signals are common functions of such boxes. As can be seen, there is significant overhead in the equipment associated with the provision of the signal to either a monitor, television, or other type of display device. The complex processing of signals prior to the display device receiving the signal creates a problem with determining the source of a faulty image. Video drivers can be unique to each monitor, and they may also conflict with other software. Interference could be caused by a rain storm in the case of some small dish satellite systems, a nearby electronic device, overhead power lines, metal shelves, or operation of a motor attached to the same power supply system as used by the monitor or computer. It can be difficult to determine whether a faulty image is due to problems with the monitor itself, such as misaligned color guns, or is caused by interference, or problems with the received signal. It may also be caused by having the wrong video driver, or perhaps the video card in the computer is causing the faulty image.

Remote diagnosis by a repair person is virtually impossible, so in many cases, an expensive replacement display is needlessly sent to the user, wasting time, equipment and incurring high postage costs if the problem does not lie in the display. This creates a huge unnecessary burden on technical support services. If the repair person travelled to the display device, they would bring diagnostic equipment which would attach to the display and provide a test pattern as input to the display. The cost of sending a repair person is even more expensive than just shipping a new display. The test pattern comprised various geometric shapes and colors which allowed the repair person to visually inspect the displayed image for at least orthogonality, interference and correct alignment of the color guns. Such equipment is described in U.S. Pat. No. 5,345,263 to Miller. U.S. Pat. No. 5,247,358 to Richards shows the display of video signals stored on a computer for adjusting the brightness of the display. This again requires external equipment to determine the location of a faulty image.

Some display devices have microprocessors and on screen controls that provide menus for adjusting volume, channel and other characteristics of the display, including contrast and brightness. Viewing these menus can provide some clues as to where a faulty image may be originating, however, such menus are not designed for such diagnostic purposes, and do not provide good indications of problems. For instance, the images displayed in such menus usually use only one of the three color guns, and hence are incapable of showing improper alignment. The menu text is usually concentrated away from the edges of the displays, where orthogonality problems are most likely to be detected. A further display device is described in U.S. Pat. No. 4,901,147 to Tajima. The results of internal diagnostic routines are displayed by characters and graphics generated by the display circuitry and superposed on top of a video signal much like the display of on screen controls discussed above. Other monitors, such as a 100 inch monitor manufactured by Sony for military use are also thought to have some form of internal diagnostics.

There is a need for an independent diagnostic tool for displays which does not require additional equipment. There is also a need for a display diagnostic tool which is independent of the external display signals provided by computer systems, set top boxes and directly received from providers of such signals by the display device. There is a further need for a diagnostic tool which provides for ease of moving the display to a different location to determine if a local source of interference is causing the faulty picture. The tool must be simple to use in order for a non-technically oriented user to be able to diagnose problems with or without the aid of a telephone support person. It must also be inexpensive to implement.

SUMMARY OF THE INVENTION

A display device is provided with the capability to provide a self generated diagnostic image which is useful to help determine the functionality of the display device, and to assist in the isolation of problems causing faulty images on the display. In one embodiment, existing circuitry and software which provides on screen display functions is enhanced to provide for display of a predetermined pattern of geometric shapes and colors. The provision of the diagnostic image is activated by a user, either by pressing a button on the display, or via external control signals provided from an attached computer or set top box. The image may be superimposed over existing video images provided by external circuitry, or such external circuitry may be completely disconnected from the display device. In this manner, a user may view the diagnostic image, and determine if distorted images are caused by the display device, or with the external circuitry. In addition, since the image is self generated, the display device may be moved to a different location to help in determining if distortion or interference is being caused by sources external to the display.

In one embodiment, existing on-screen display circuitry is used to store the diagnostic pattern and to display it. This minimizes the cost of implementing the invention. A suitably programmed microprocessor provides for control of the components in the on-screen display circuitry. A read only memory under control of the microprocessor contains the test pattern, and is coupled to a signal generator for generating the red, green and blue signals representative of the pattern which are then provided to a multiplexor. The multiplexor also receives and switches between video input from an external source, and under control of the microprocessor, routes the appropriate signals to the guns and deflection yoke of a cathode ray tube (CRT). The diagnostic pattern may be either superimposed on the video signal, or the video signal may be isolated from the pattern with only the pattern being sent on to the CRT. The isolation also allows video signal connectors to be completely disconnected, and the pattern will still be displayed if desired. User controls are coupled to the microprocessor to enable the display of the diagnostic pattern. They are activated either through a separate switch or combination of buttons or switches, or by holding in a power-on button for a predetermined period of time. In a further embodiment, the user controls comprise common remote control circuitry.

The diagnostic pattern comprises a full screen grid of various geometric shapes and colors in one embodiment. A grid of lines forming rectangles makes up the background of the pattern. A line forming a large circle is centered in the display, encompassing smaller concentric circles, and in some embodiments, multicolored quadrilateral shapes. In each of the four corners of the display, further sets of concentric circles are formed. By looking at the pattern, a user can easily see distortions and interference in the image. The pattern can also aid in correct alignment adjustment for height and width of the video image via standard user controls. In order to optimize the use of available storage space in the limited read only memory, some of the patterns are formed of lines which alternate between the red, blue and green colors of the color guns of the CRT. In particular, the square grid pattern is so formed. Comprising squares in one embodiment, each of the three colors is used once in succession to form each side of a square. This allows one to easily determine if any of the color guns are misaligned, as successive colored lines should appear to continue smoothly as an extension of the line preceding it. If the line appears to jump to a side at the start of a new color, there is some misalignment of the color guns. Both vertical and horizontal sides of the squares are formed with alternating colors.

The present invention allows the ability to isolate problems seen in displayed video signals. By providing the ability of the monitor to self generate a diagnostic pattern without the need for coupling to an external video source, users may diagnose some potential problems without having to have special test equipment. In addition, because the pattern is self generated, the display device may be easily relocated to a remote location and tested without having to move a computer or set top box with it. It may then be retested to help determine if there was a source of interference causing problems in the first location. The present invention saves time and expense in diagnosing problems with images being displayed, many times preventing the unneeded and costly shipment of replacement displays when the problem was not with the display device in the first place.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1:
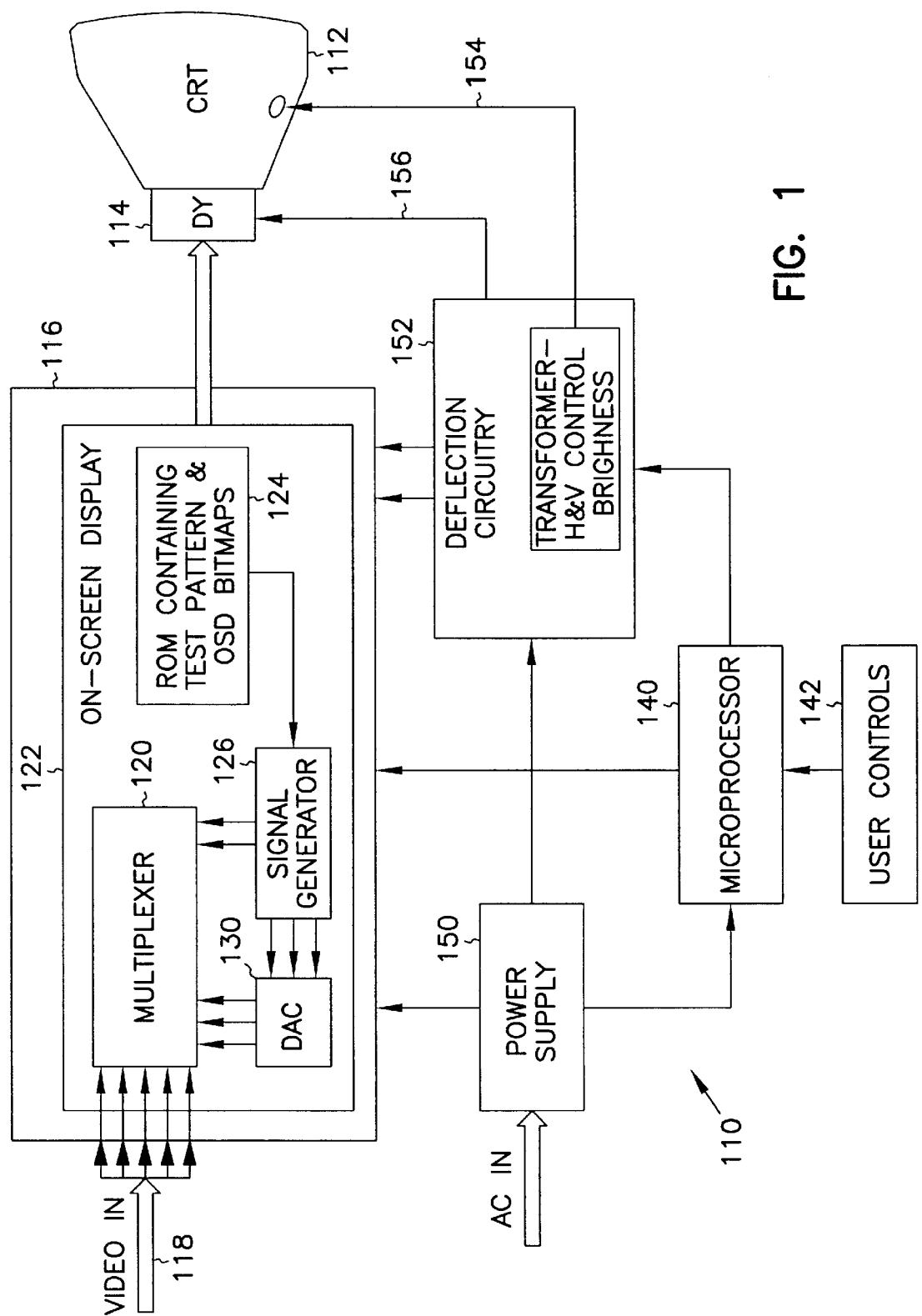
FIG. 1 is a block diagram illustrating a display device constructed in accordance with the present invention.

A display device, such as a television or computer VGA or SVGA monitor is shown generally at 110 in FIG. 1. Sony Corporation 15" (CPD15F23) and 17" (CPD17F23) monitors may be equipped with the circuitry to provide the self diagnostic capability described herein. The display comprises a cathode ray tube (CRT) 112 having a deflection yoke 114 which contains at least three color guns for red, green and blue colors from which all colors may be obtained. The display further comprises a video circuit board 116 for providing analog RGB signals directly to the deflection yoke 114 for controlling the color guns to provide images on CRT 112. The video board 116 receives a video in signal 118 from an external source, such as a computer or set top box, or from a tuner which receives broadcast unencrypted video signals, and may be included within a common television in further embodiments. The video board 116 also provides information back to such external devices on power-on, such as refresh rates, resolution settings and other data to enable the external devices to communicate appropriately with the display.

The video in signal 118 comprises analog RGB signals as well as horizontal and vertical synchronization signals which are all provided to a multiplexor 120 residing on an on-screen display (OSD) circuit 122. A second source of video signals is provided in the form of a read only memory (ROM) 124, which holds data for producing OSD menus and in accordance with the present invention, a diagnostic pattern as further described below with respect to FIG. 2. Existing OSD circuitry is used in one embodiment to save money on components.

The ROM 124 on the OSD circuit 122 is coupled to a signal generator 126 which generates digital representations of RGB signals, as well as appropriate vertical and horizontal sync signals. The RGB signals from the signal generator 126 are provided to a digital to analog converter 130, which converts them to analog RGB signals which are in turn provided to the multiplexor 120, which has the ability to superimpose the various video inputs it receives, or selectively provide one of the video signals to the deflection yoke 114 of the CRT 112.

The multiplexor 120 is controlled by a microprocessor 140, which in turn is controlled by a user operating user controls 142. User controls 142 in one embodiment comprises power-on switch and other standard brightness and contrast type controls for adjusting the display device. In one embodiment, the user controls comprise a remote control device along with reception circuitry which may operate in the IR, RF, or other suitable frequency range. One of the controls in either embodiment, be it a separate button, combination of buttons or switches, or an existing button such as the power-on button when pressed for a predetermined amount of time, commands the microprocessor to control the ROM 124 to provide the diagnostic pattern to the multiplexor 120, and in turn controls the multiplexor 120 to provide the diagnostic pattern to the CRT for display, either superimposed on the video signal on line 118, or alone, isolated from video signal 118.

Other elements, common to display devices, include a power supply 150 coupled to a source of power, such as household current, or in some embodiments a battery, standard deflection circuitry 152 for providing a high voltage anode on line 154, and high voltage deflection control to yoke 114 on line 156.

Figure 2:
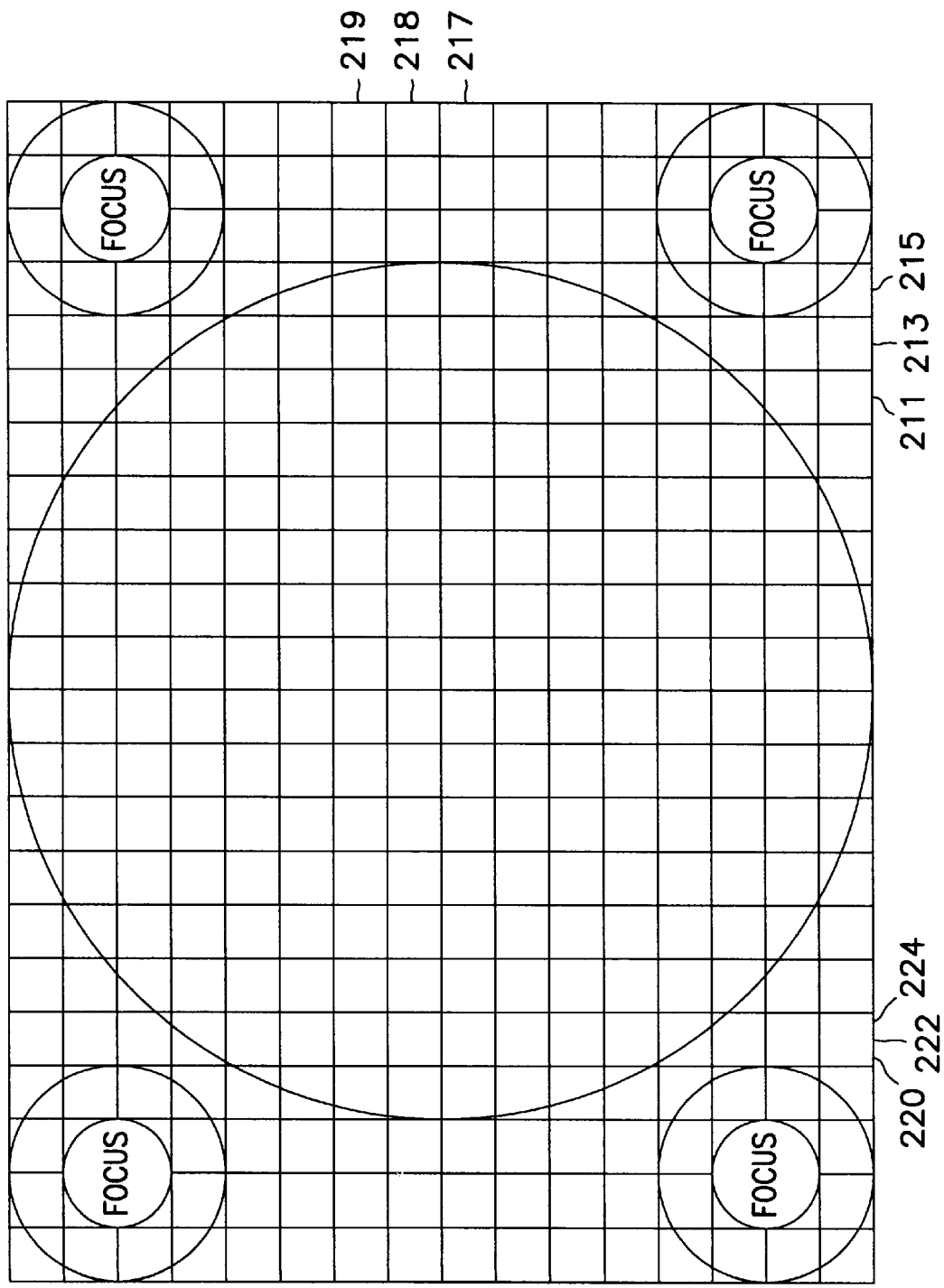
FIG. 2 is diagram of a diagnostic pattern generated by the display device of FIG. 1.

The diagnostic pattern used in one embodiment is shown in FIG. 2. It is kept simple so that it does not generate many questions from users wondering if it is correct. The pattern is similar to many Electronic Industry Association standard registration test charts, having concentric focus circles in each corner of the image as well as one or more concentric circles in the center, and including a square or quadrilateral grid pattern over portions of the image, or the entire image. In addition, in one embodiment, consecutive linear portions of the lines forming the grid or circles are displayed using alternating color guns. At the transition from one color to another, such as red to green, the line should appear to be continuous. If one of the guns is misaligned, the line will appear to be offset, but parallel at the start of the next color. This will be visible in both horizontal and vertical lines. In one embodiment, a horizonal side of a square of the pattern indicated at 211 is formed by the red color gun. A horizontal side 213 of the next adjacent square is formed by the green color gun, and a horizontal side 215 of the next square is formed by the blue gun. The lines should appear to be a part of the same geometric line if the guns are correctly aligned. Similarly, the vertical sides of three adjacent squares indicated at 217, 218 and 219 are formed by successive red, green and blue color guns, and should also appear as part of the same geometric line. In a further embodiment, the sides of a single square are formed of three substantially equal but differently colored segments indicated at 220, 222 and 224. The sequence of the colors may be varied from square to square if desired, and longer lines may also be used in different portions of the image if desired.

One benefit of using the grid lines for both color gun alignment checking and the checking of pin cushioning, interference and other problems, is that the pattern stored remains relatively simple, and expressible in a minimal amount of storage in the ROM. Since ROM can be expensive, and already holds much of the OSD data, it is desired to use as little storage as possible for this pattern. Even simpler patterns with varying grid spacing and numbers of concentric circles will be apparent to those skilled in the art. The size of the individual geometric shapes and patterns will also depend on the size of the display. The pattern in FIG. 2 is one which is suitable for almost all currently available consumer televisions and monitors. It should fill the viewable area of the display device, and will be larger or smaller depending on the viewable area of the display. The actual manner in which such images are stored in ROM is well known to those skilled in the art. Some common formats for image storage include PSEG, TIF, and GIF, which involve varying forms of well known compression. Several software tools are available to provide such image representations from graphics programs and scanners or fax machines.

Figure 3:
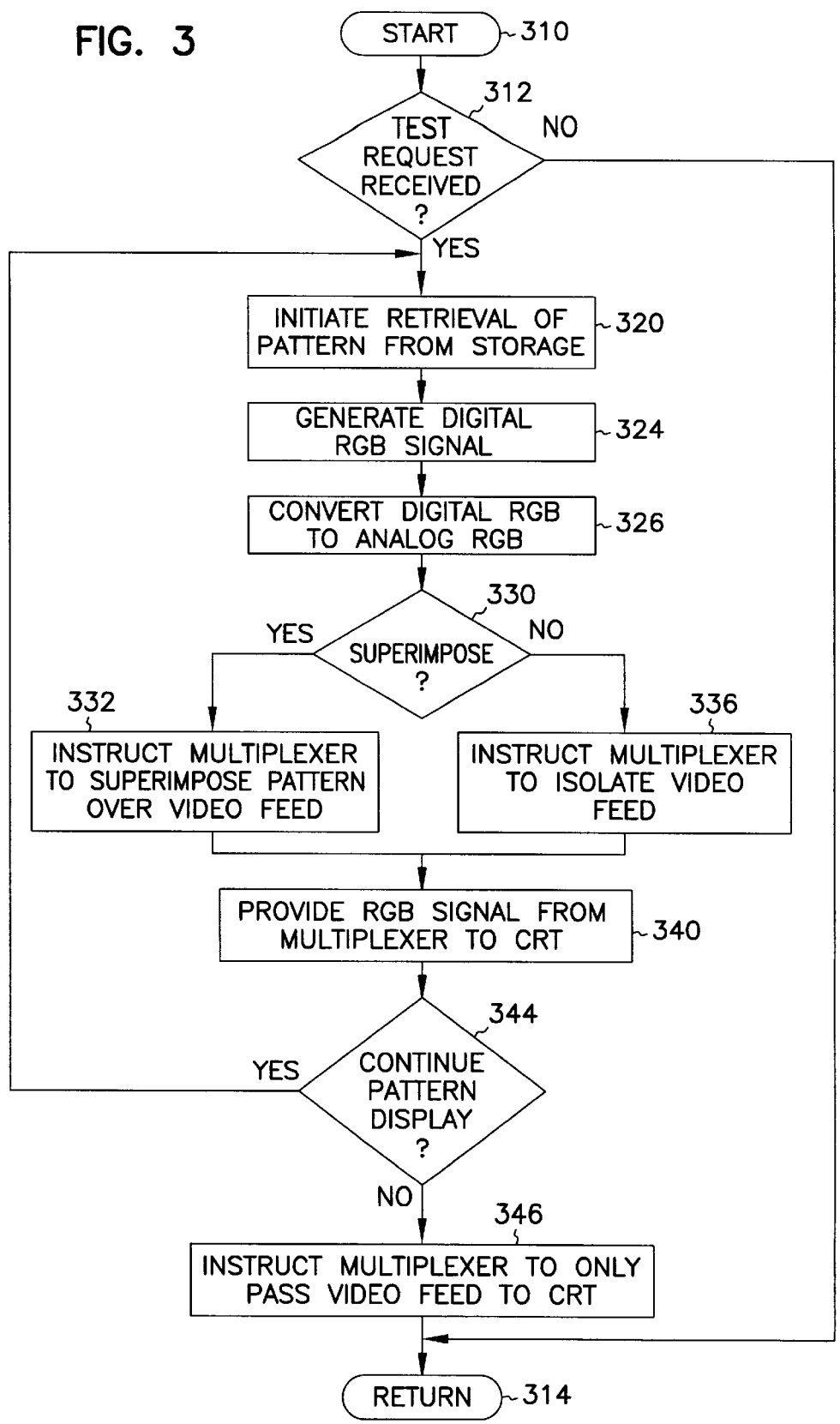
FIG. 3 is a flowchart of the steps performed in providing a diagnostic pattern such as that shown in FIG. 2.

A flowchart in FIG. 3 shows the steps taken to display the test pattern. Most of the steps in one embodiment are directed by a program running on the microprocessor 140 unless otherwise indicated. In further embodiments, state machines or circuitry may also be used. The program is stored in ROM 124, and may also reside in other types of fixed or transportable storage medium such as CD ROM, diskette or tape to name a few as represented by block 124.

The program is entered at start 310, and decision block 312 is used to determine if a test request has been received. If not, control is returned to another program at return 314. If a test was requested, retrieval of the diagnostic pattern from storage is requested at 320. A digital RGB signal is generated at 324, and converted to analog at 326. Decision block 330 is used to determine if the request is to display the pattern on top of other video signals provided external to the display device, or to isolate the other video feeds so that they do not affect the display of the pattern. If isolation is requested, the multiplexor is instructed to isolate the video feed at 336. If not, the multiplexor is directed to superimpose the pattern over the video feed. The resulting RGB analog signal is then provided to the color guns and yoke of the CRT at 340. In one embodiment, the display pattern is displayed for a predetermined period of time, such as ten seconds. In a further embodiment, the user may select that the pattern be discontinued in much the same manner as current OSD displays operate, such as by pressing the same button or switches. This decision in the program is indicated at decision block 344. If the time has not expired, or the user has not deselected the pattern, block 320, continuing retrieval of the pattern from storage, is entered. If the result of decision block 344 is negative, a block 346 instructs the multiplexor to discontinue feeding the pattern to the CRT and to feed only the video feed to the CRT.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A display device having the capability of receiving video signals from an external source, and displaying said signals on a display screen, comprising:

a storage for storing a diagnostic pattern for display on the display screen, wherein the storage comprises a read only memory containing instructions for a microprocessor;

an input device mounted on the display device for receiving an instruction directly from a person viewing the display screen to display the diagnostic pattern independent of the video signals from the external source; and a controller for converting the instruction into control signals to cause the storage to provide the diagnostic pattern for display on the display screen, wherein the controller comprises the microprocessor, wherein the microprocessor is coupled to the input and to the multiplexor for causing the multiplexor to provide the diagnostic pattern to the display screen for display in response to instructions received on the input;

a multiplexor coupled to the display screen and to the storage and external source of video signals for selectively providing the pattern and the video signals for display on the display screen, wherein the multiplexor has the capability to isolate the external video signals from the diagnostic pattern and provide the diagnostic pattern to the display screen.

2. The display device of claim 1 wherein the microprocessor is coupled to the read only memory, and provides addressing for accessing the diagnostic pattern and instructions for execution on the microprocessor.

3. A display device having the capability of receiving video signals from an external source, and displaying said signals on a display screen, comprising:
 a storage for storing a diagnostic pattern for display on the display screen;
 an input device mounted on the display device for receiving an instruction directly from a person viewing the display screen to display the diagnostic pattern independent of the video signals from the external source; and
 a controller for converting the instruction into control signals to cause the storage to provide the diagnostic pattern for display on the display screen, wherein the diagnostic pattern which is displayed comprises a grid pattern of horizontal and vertical lines, and multiple circles appearing in selected corners of the display screen, wherein at least one of the horizontal or vertical lines comprises multiple linear end to end segments of red, green and blue colors.

4. A display device having the capability of receiving video signals from an external source and displaying said signals on a display screen, comprising:
 a storage for storing a digital representation of a diagnostic pattern for display on the display screen;
 a signal generator for converting the digital representation of the diagnostic pattern into a digital signal representative of red, green and blue components of the pattern;
 a digital to analog converter for converting the red, green and blue digital components of the pattern into analog red, green and blue video signals;
 a multiplexor coupled to the external video source and to the digital to analog converter for selectively providing the video signals to the display screen for display;
 an input for receiving an instruction external to the source of the video signals to display the diagnostic pattern; and
 a controller coupled to the input, storage and multiplexor for controlling the multiplexor.

5. The display device of claim 4 wherein the controller comprises a microprocessor.

6. The display device of claim 5 wherein the storage comprises a read only memory containing instructions for the microprocessor.

7. The display device of claim 6 wherein the multiplexor has the capability to isolate the external video signals from the diagnostic pattern and provide the diagnostic pattern to the display screen.

8. The display device of claim 7 wherein the microprocessor is coupled to the read only memory, and provides addressing for accessing the diagnostic pattern and instructions for execution on the microprocessor.

9. The display device of claim 4 wherein the diagnostic pattern which is displayed comprises a grid pattern of horizontal and vertical lines, and multiple circles appearing in selected corners of the display screen.

10. The display device of claim 5 wherein at least one of the horizontal or vertical lines comprises multiple linear end to end segments of red, green and blue colors.

11. A method for providing a diagnostic pattern for display on a display screen of a display device, comprising the steps of:
 receiving an indication directly from a user pressing a button on the display device indicating that the diagnostic pattern should be displayed;
 retrieving digital signals representative of the image from a storage device within the display in response to the indication;
 converting the digital signals to analog display signals representative of the diagnostic pattern; and
 displaying the diagnostic pattern represented by the analog display signals independent of video signals from a source external to the display device, wherein the diagnostic pattern which is displayed comprises a grid pattern of horizontal and vertical lines, and multiple circles appearing in selected corners of the display screen, wherein at least one of the horizontal or vertical lines comprises multiple linear end to end segments of red, green and blue colors.

12. A method of testing a display device comprising:
 disconnecting the display device from a computer system;
 moving the display device to an area remote from the computer system;
 depressing a diagnostic pattern button on the display device; and
 viewing an internally generated diagnostic pattern on the display device.

* * * * *